United States Patent Office 3,423,883
Patented Jan. 28, 1969

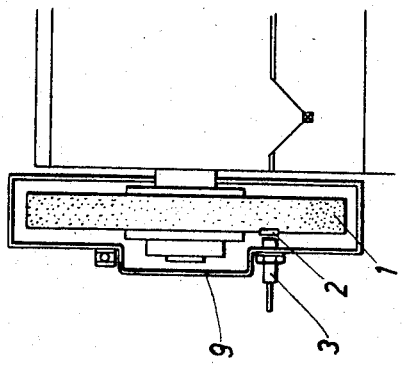
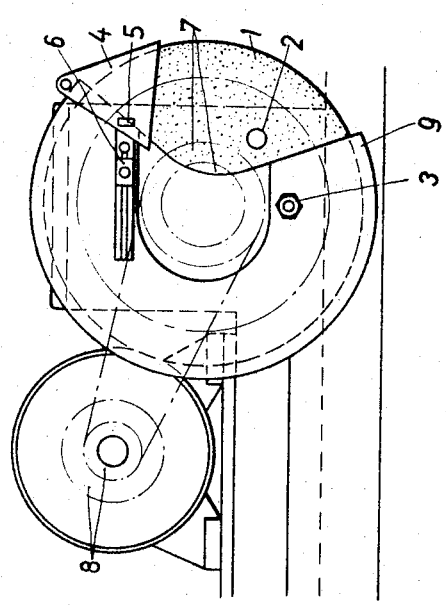

3,423,883
SAFETY DEVICE FOR CONTROLLING THE CIRCUMFERENTIAL SPEED OF GRINDING WHEELS
Karl Storck, Offenbach am Main, Germany, assignor to MSO Maschinen- und Schleifmittelwerke A.G., Offenbach am Main, Germany
Filed Mar. 10, 1966, Ser. No. 533,151
Claims priority, application Germany, Mar. 22, 1965, M 64,601
U.S. Cl. 51—134.5     4 Claims
Int. Cl. B24b 5/00, 49/00, 51/00

ABSTRACT OF THE DISCLOSURE

A safety device for supervising the rotational speed of a rotary grinding disk in which control means stop the drive means of the disk when the diameter thereof decreases due to wear, below a predetermined value and also when the rotational speed of the disk exceeds a selected maximum speed.

---

Figure 1:
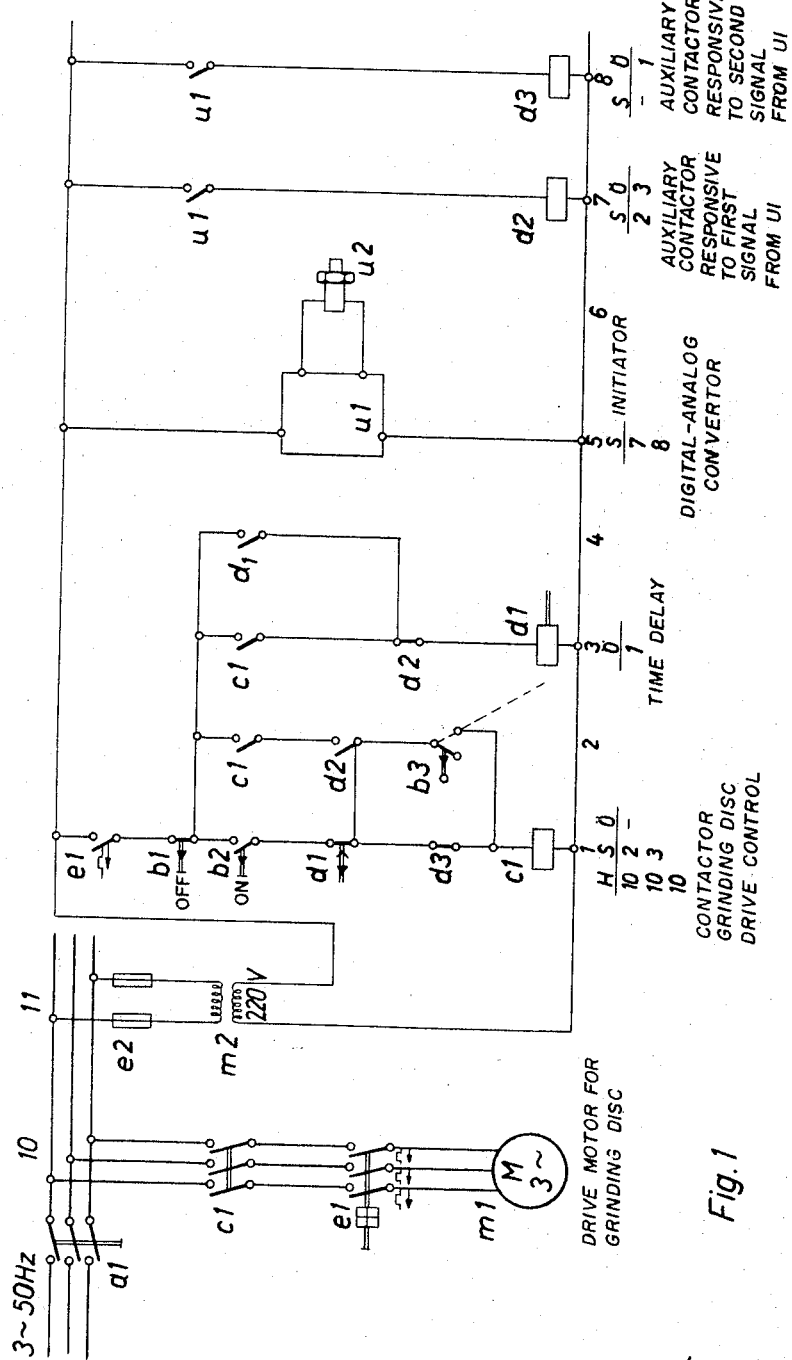

The cutting capacity of a grinding wheel generally increases with increasing rotational speed. But the increase of the rotational speed is limited by the resistance of the material from which the grinding wheel is made and if these limits are exceeded, the operating personnel become endangered. In the present state of the art and the development in the design of machine tools and particularly in the design of machine tools for chip removal, higher performances are continually required. Thus achievement of a grinding speed of 60 m./s. becomes ever more important with circular grinding machines. This entails, besides increasing the speed of the grinding spindle, an increase in the drive power and thus also an improvement of the bearings in the grinding spindle head. An increased rotational speed obviously causes an increased circumferential speed, which makes it absolutely necessary or at least highly desirable to identify grinding wheels made for these particularly high speeds. In spite of this, human inadequacy may lead to errors so that a mix up of the types of grinding wheels is not excluded.

It is an object of the invention to provide measures in connection with the grinding wheels of grinding machines which are practically foolproof and automatically prevent the erroneous use of grinding wheels. The starting point for such measures is the grinding wheel itself, which must bear a statement of the speed it is allowed to run and in which cases it is to be used.

The present invention solves this problem by providing the grinding wheel, whose structure allows a grinding speed of 60 m./s., with a pulse transmitter fixed outside of the wear zone, the pulse frequency of which controls the drive of the grinding wheel motor. The pulse transmitter applied on the grinding wheel outside the wear zone is preferably a mark which is scanned without direct contact by a proximity-sensing initiator mounted rigidly and immovably on the protective hood of the grinding wheel. This initiator sends the received pulses to a digital analogous converter converting the single pulses proportional to the frequency, that is, the speed, into a voltage, and acts through an amplifier on an output relay connected to the control circuit of the motor.

Thus it is assured that always only such grinding wheels which are designed for high circumferential speeds and are provided with a contact mark or pulse transmitter respectively, are used on high-speed machines. If by error a grinding wheel for normal grinding speed (30 m./s.) is mounted on the machine, no pulse transmission takes place because the pulse transmitter on the grinding wheel is missing and the drive motor switches off automatically after a short running time because the motor circuit is opened.

In another embodiment of the invention, the mark used as pulse transmitter is replaced by a ring embedded in the lateral wall of the grinding wheel outside the wear zone. This ring is scanned without direct contact by a finger fastened on the protection hood and connected through a relay with the holding contactor of the drive motor. If this ring is missing, that is in case of a wrongly mounted grinding wheel, the flow of current is again interrupted and the drive motor is stopped again after a short running time.

The invention permits further to put into operation an electric switching device and to stop the drive motor after the first revolutions. To this end, a switching device checks the diameter in relation to the circumferential speed of the grinding wheel. More specifically, a limit switch is caused to open by coaction with a stop fastened on the pivotable spray protector of the grinding machine. With an increasing wear of the grinding wheel its circumferential speed decreases accordingly, while the speed remains unchanged. By a corresponding adjustment of the limit switch with the stop on the spray protector the drive motor is switched off when a predetermined minimum diameter of the grinding wheel is reached. By changing the position of the drive belts on the transmission gear the original circumferential speed is reached again by means of a corresponding transmission ratio.

The drawing shows diagrammatically embodiments of the invention.

FIG. 1 is a circuit diagram providing for connection of the drive motor with the electric mains only if a grinding wheel suitable for the high speed is used, FIG. 2 is an edgewise view of the grinding wheel with the arrangement of the scanning device, and FIG. 3 shows the arrangement of the switching-off device in case of a too-small circumferential speed of the grinding wheel.

By operating a contractor $c1$ (FIG. 1) the motor M for the grinding wheel drive is readied. The main switch $a1$ is switched on and the motor switch $e1$ closes. By pressing the ON-key $b2$ the contractor $c1$ in the motor circuit is switched on. The drive motor M begins to turn and effects the rotation of a grinding wheel or disk 1. Simultaneously with the contactor $c1$ the time relay $d1$ is energized which holds itself in the circuit 4 by means of its no-delay contact. When the grinding wheel has begun to rotate, it sends a pulse to the initiator 3 (FIG. 2) by means of a pulse mark 2 provided, for instance, by embedding outside of the wear zone of the grinding wheel on one of the lateral surfaces of the wheel. As a result, the digital analog converter $u1$ produces the first control signal, by means of which the auxiliary contactor $d2$ in the circuit 7 is switched on. In the circuit 2 the auxiliary contactor $d2$ switches a contact, so that the contactor $c1$ can hold itself. Simultaneously, the auxiliary contactor $d2$ in the circuit 3 switches off the time relay $d1$ and the grinding operation continues.

In case of a wrong selection of a grinding wheel, for instance, when if a grinding wheel without a mark (FIGS. 1 and 2) is inserted, no pulses can come from mark detector $u2$. The time relay $d1$ then opens the pulse line from the contactor $c1$ and the drive motor M comes to a standstill. The time relay $d1$ is so designed that it will open only after the control signal has come from converter $u1$.

In order to supervise the correct position of the drive belts (FIG. 3) on drive pulleys 7 and 8 coupling the drive motor with the axle of the grinding wheel, a spray protector 4 is provided which is pivotally supported on a guard hood 9. This spray protector carries a stop 5 for operating a limit switch 6, in order to maintain the circumferential speed on the grinding wheel 1. If the wear of the grinding wheel has progressed so far that the circumferential speed is at the lower limit, stop 5 on protector 4 engages the end switch 6 (b3 in FIG. 1) due to the advance of the spray protector 4 so that the drive motor is switched off. After having changed the drive belts to a higher transmission ratio and after a corresponding adjustment of the limit switch 6, the grinding operation can be continued. The ratio of the circumferential speed to the diameter of the grinding wheel 1 is compensated by a correspondingly adjustable transmission ratio gear. If no coincidence is present and if, for instance, the grinding wheel runs with a too high speed, a control signal is given by converter $u1$ (FIG. 1) and the auxiliary contactor $d3$ is switched, opening a contact in the circuit 1. The contact $d3$ is bridged again by a closing contact of the limit switch $b3$, if the spray protector 4 has correctly pressed the limit switch 6 (FIG. 3). As is apparent, this limit switch corresponds to switch $b3$ in FIG. 1.

As the switching path between the limit switch 6 and the stop 5 at the spray protector 4 (FIG. 3) depends on the diameter of the grinding wheel, the length of the switching path must be corrected according to the eventually modified diameter of the grinding wheel.

If the setting of a correct switching path between limit switch 6 and stop 5 on protector 4 is neglected, the limit switch $b3$ (FIG. 1) cannot be operated by the coaction between switch 6 and stop 5 as previously described, the control signal 2 is sent, whereby the contactor $c1$ is switched off and the drive motor stopped.

Hereby it is avoided that, with a false position of the belts 7 and 8 (FIG. 3) a new grinding wheel is used, an excessively high circumferential speed arises, causing a disintegration of the grinding wheel.

I claim:

1. A safety device for supervising the rotational speed of a rotary grinding disk, said safety device comprising a drive means for rotating the grinding disk to be supervised, a pulse-transmitting means secured to the disk outside of a selected wear zone thereof and rotating in unison with the disk, said transmitting means generating pulse signals in accordance with the rotational speed of the disk, and control means controlling said drive means and controlled by the frequency of the pulse signals received from said transmitting means, said control means deactivating the drive means when the frequency of said pulse signals per a time unit exceeds a value indicative of an excessive rotational speed of the disk.

2. A safety device according to claim 1, wherein said pulse-transmitting means comprises a marker means provided on the disk outside said selected wear zone for rotation in unison with the disk, sensing means stationarily mounted spaced apart from said marker and responsive to said marker for generating pulse signals in accordance with the rotational speed of said marker, a digital-analog converter converting received signal pulses to a corresponding output voltage, said sensing means being connected in circuit with said converter for feeding signal pulses generated by the sensing means to the converter, and wherein said control means include relay means controlled by the voltage output of the converter to deactivate the drive means when said voltage output departs from a predetermined voltage.

3. A safety device according to claim 1 and comprising movable means moving in accordance with a decrease in the circumferential speed of the disk due to wear thereof, said movable means operating said control means to effect deactivation of the drive means by the control means in response to a decrease in the circumferential speed of the disk below a predetermined value.

4. A safety device according to claim 3, wherein said movable means comprise a pivotally mounted spray guard pivoting in accordance with a decrease in the diameter of the disk due to wear thereof and mounting a stop member, and wherein said control means comprise switch means coacting with said stop member for operation by the same in a pivotal position of the spray guard corresponding to a selected decrease in the diameter of the disk, operation of the switch means actuating the control means for deactivation of the drive means.

References Cited

UNITED STATES PATENTS

| | | | |
|---|---|---|---|
| 2,130,823 | 9/1938 | Wilson | 51—134.5 |
| 2,947,121 | 8/1960 | Coes | 51—134.5 |
| 2,968,136 | 1/1961 | Behlen | 51—134.5 |
| 3,072,897 | 1/1963 | Fisher | 318—464 X |
| 3,113,405 | 12/1963 | Schneider | 51—134.5 |
| 3,248,823 | 5/1966 | Finkl | 51—134.5 |
| 3,250,043 | 5/1966 | Finkl | 51—134.5 |

LESTER M. SWINGLE, *Primary Examiner.*

D. G. KELLY, *Assistant Examiner.*

U.S. Cl. X.R.

51—165, 272